US011858112B2

(12) United States Patent
Liou

(10) Patent No.: US 11,858,112 B2
(45) Date of Patent: Jan. 2, 2024

(54) TOOL INCLUDING AN IMPACTING STRUCTURE

(71) Applicant: Tang Chou Industrial Co., Ltd., Nantou County (TW)

(72) Inventor: Mou-Tang Liou, Taichung (TW)

(73) Assignee: Tang Chou Industrial Co., Ltd., Nantou County (TW)

( * ) Notice: Subject to any disclaimer, the term of this patent is extended or adjusted under 35 U.S.C. 154(b) by 148 days.

(21) Appl. No.: 17/464,008

(22) Filed: Sep. 1, 2021

(65) Prior Publication Data

US 2023/0068850 A1 Mar. 2, 2023

(51) Int. Cl.
*B25G 3/38* (2006.01)
*B66F 15/00* (2006.01)

(52) U.S. Cl.
CPC ................ *B25G 3/38* (2013.01); *B66F 15/00* (2013.01)

(58) Field of Classification Search
CPC .................................. B25G 3/38; B66F 15/00
USPC ..................... 254/131, 131.5; 81/27, 45, 463
See application file for complete search history.

(56) References Cited

U.S. PATENT DOCUMENTS 4,470,440 A * 9/1984 Thor ....................... B27L 7/005 81/463
4,785,692 A * 11/1988 Holmes ................... E01B 31/26 81/463
7,520,197 B2 * 4/2009 Kingham .............. E04D 15/003 81/463
9,009,938 B2 * 4/2015 Noyes ..................... B25B 27/02 254/99
2004/0177662 A1 * 9/2004 Bosse .................... A62B 3/005 70/465

FOREIGN PATENT DOCUMENTS

TW I648133 B 1/2019

* cited by examiner

*Primary Examiner* — Lee D Wilson
*Assistant Examiner* — Shantese L McDonald

(57) ABSTRACT

A tool including a buffer structure adapted to prevent shocks includes a tool head, a first shaft structure, and a second shaft structure. The tool head has a first connection receiving a pivot. The first shaft structure includes a slide. The second shaft structure is disposed on the slide and links with the tool head. The second shaft structure is movable on the slide such that the tool head is moved toward and away from the first shaft structure. The second shaft structure has a second connection receiving the pivot. The tool head is pivotal with respect to the second shaft structure. Further, a resilient member is disposed between the first and the second shaft structures. The second shaft structure is biased by the resilient member.

8 Claims, 11 Drawing Sheets

TOOL INCLUDING AN IMPACTING STRUCTURE

BACKGROUND OF THE INVENTION

1, Field of the Invention

The present invention relates to an impact tool including an impacting structure adapted to impact a driving head of the tool.

2. Description of the Related Art

Taiwan Pat. No, 1648133 shows a crowbar tool with one claw adapted to exchange positions with respect to another claw. The tool includes a main body and a group of prying members pivotally coupled together by a pivoting mechanism. The main body extends along an axis and has a first and a second connecting parts which extend radially to the axis and arranged on two different sides of the axis.

In a situation where the tool is stuck under a work piece to be pried, a user generally applies an external force to hit the tool so as to loosen it from the work piece and create a gap for reinsertion. The impact of the external force, however, causes damage to the pivoting mechanism.

The present invention is, therefore, intended to obviate or at least alleviate the problems encountered in the prior art.

SUMMARY OF THE INVENTION

According to the present invention, there is disclosed a tool including an impacting structure adapted to impact a driving head of the tool. The tool includes a tool head, a first shaft structure, and a second shaft structure. The tool head has a first connection receiving a pivot. The first shaft structure includes a slide. The second shaft structure is disposed on the slide and links with the tool head. The second shaft structure is movable on the slide such that the tool head is moved toward and away from the first shaft structure. The second shaft structure has a second connection receiving the pivot. The tool head is pivotal with respect to the second shaft structure. Further, a resilient member is disposed between the first and the second shaft structures. The second shaft structure is biased by the resilient member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing other structures, methods and systems for carrying out the several purposes of the present invention. It is important, therefore, that the claims be regarded as including such equivalent constructions insofar as they do not depart from the spirit and scope of the present invention.

Further, the purpose of the abstract is to enable the public generally, and especially scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objectives, advantages, and new features of the present invention will become apparent from the following detailed description of the invention when considered in conjunction with the accompanied drawings.

DETAILED DESCRIPTION OF THE INVENTION

Figure 1:
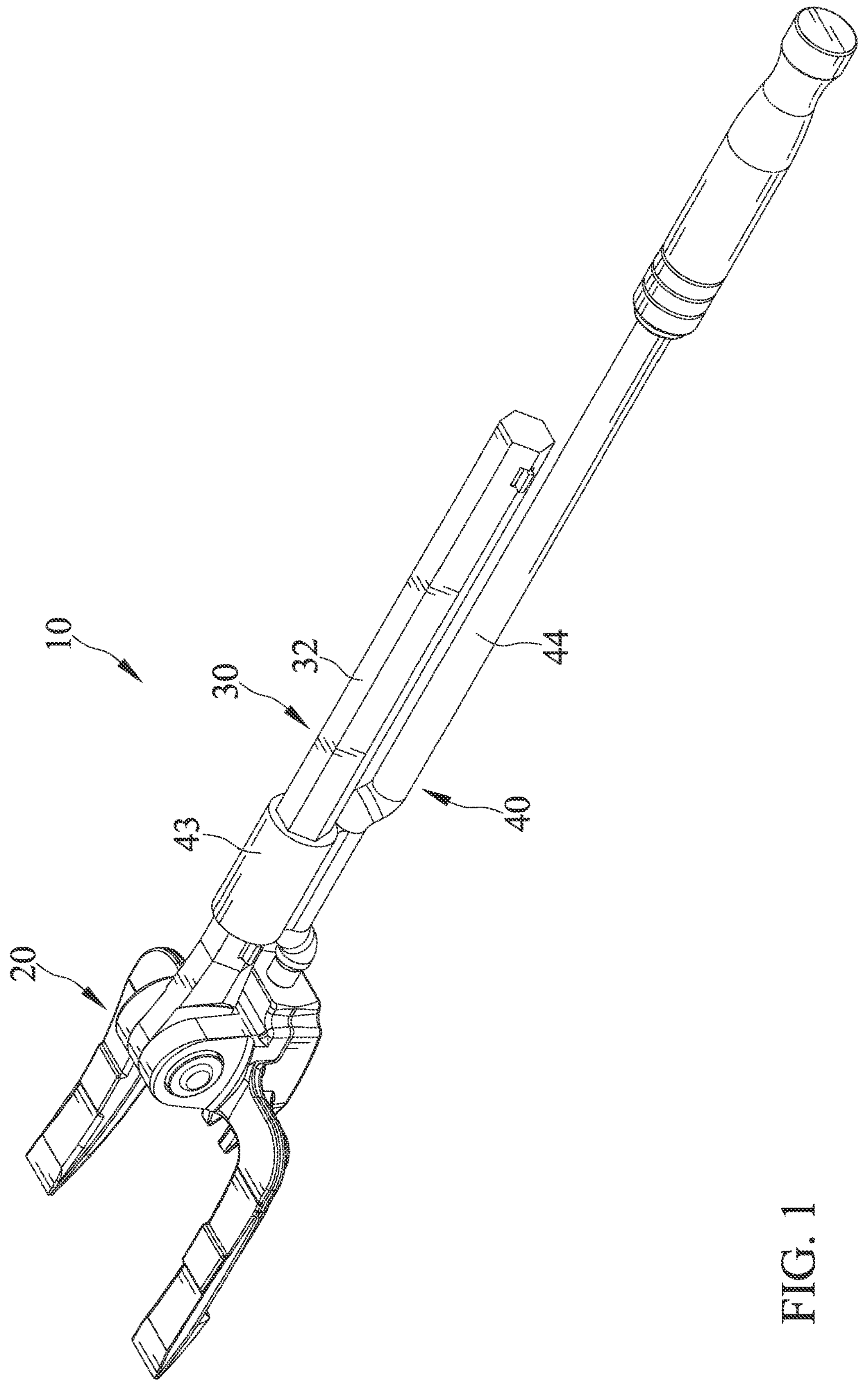
FIG. 1 is a perspective view of a tool including an impacting structure in accordance with a first embodiment of the present invention.
Figure 2:
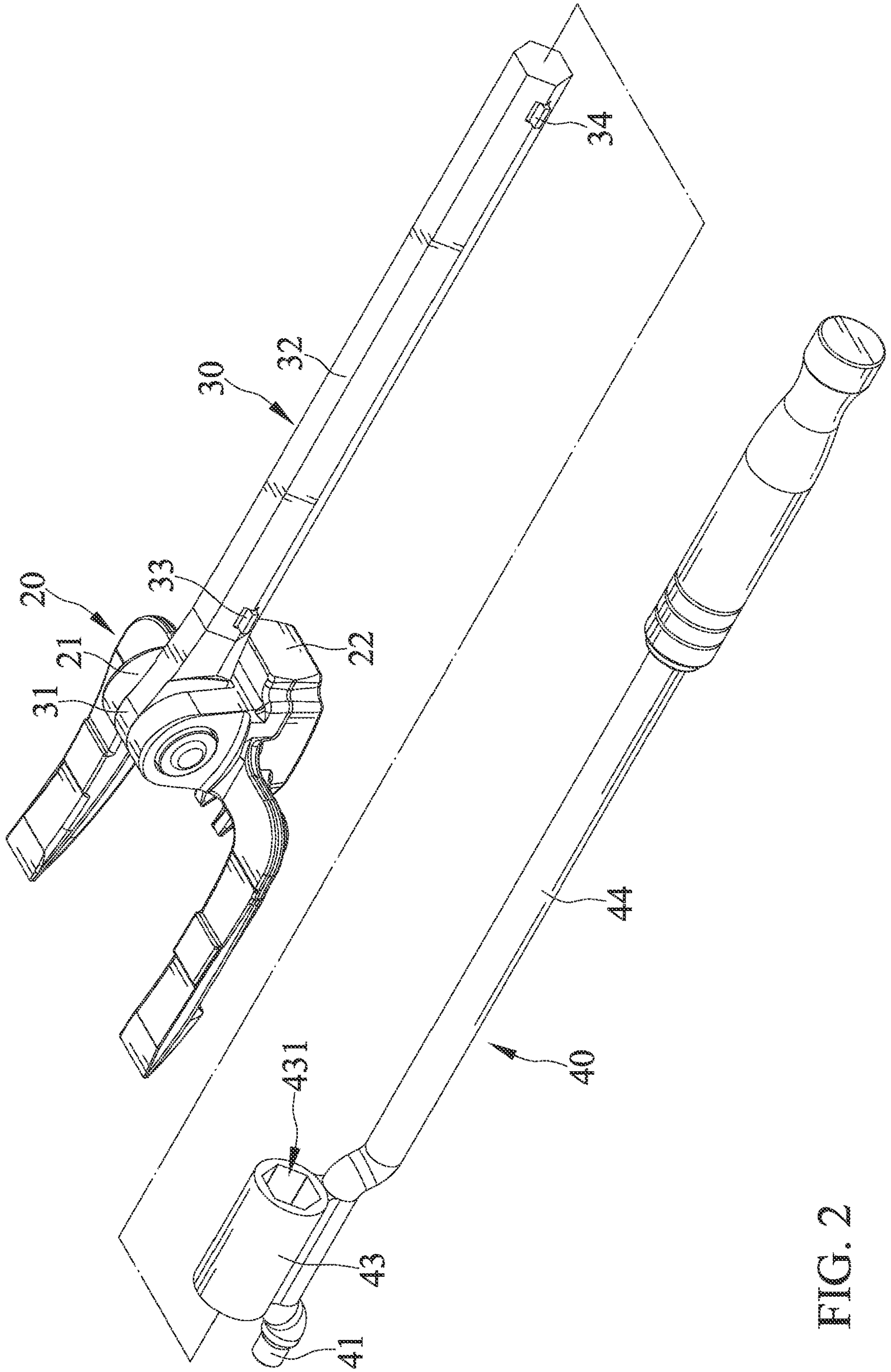
FIG. 2 is an exploded perspective view of the tool shown in FIG. 1.
Figure 3:
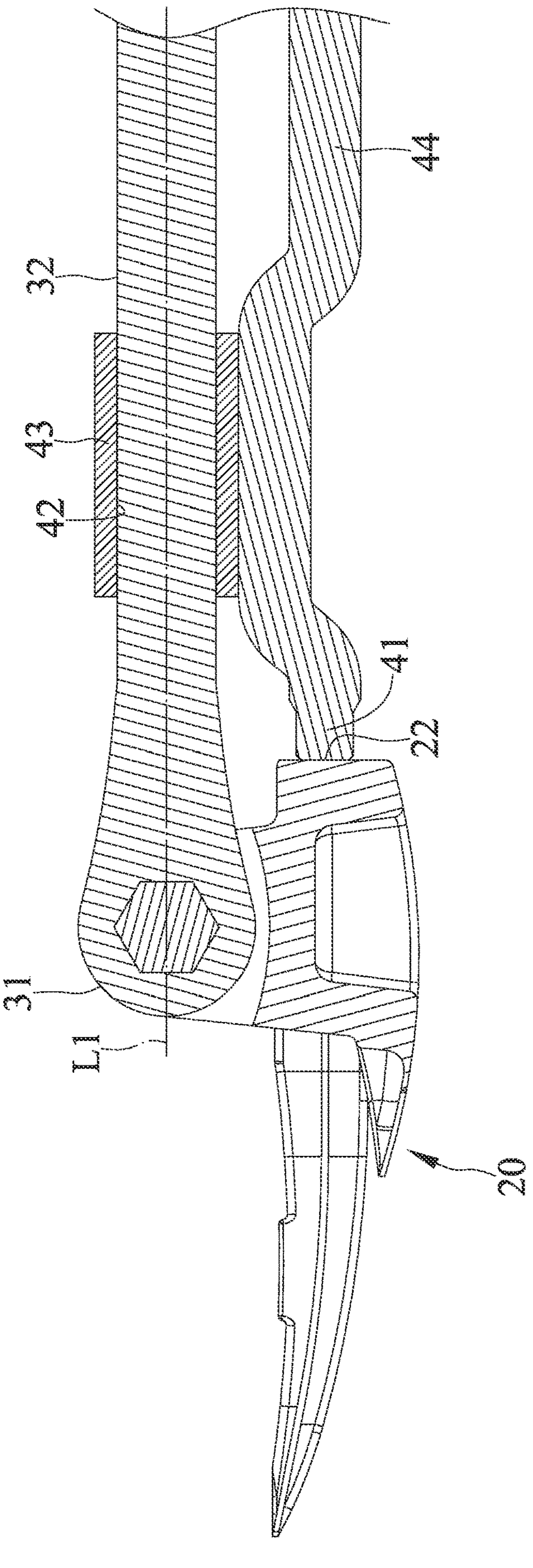
FIG. 3 is another cross-sectional view of the tool shown in FIG. 1.
Figure 4:
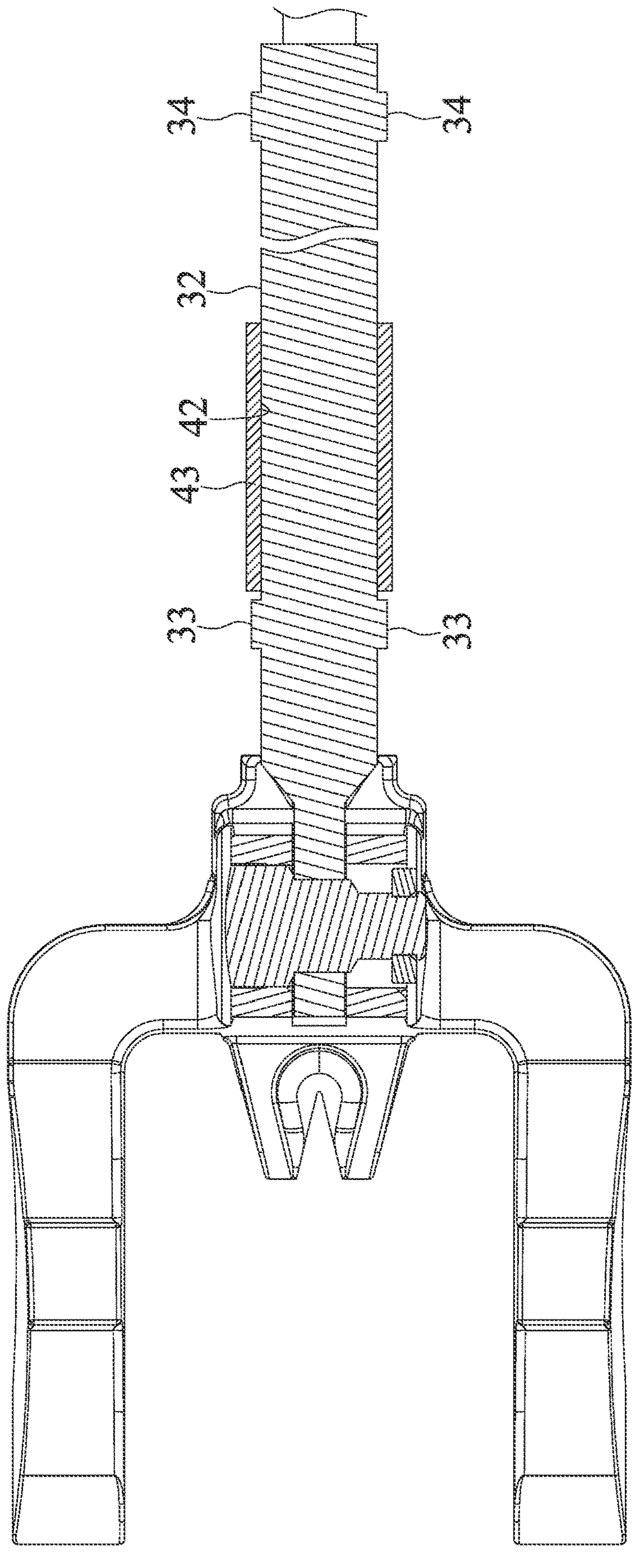
FIG. 4 is another cross-sectional view of the tool shown in FIG. 1.
Figure 5:
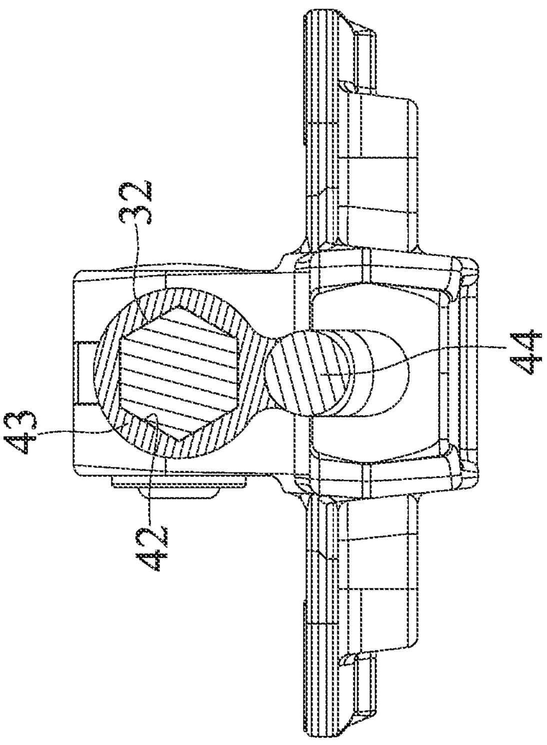
FIG. 5 is another cross-sectional view of the first end of the tool.

FIGS. 1 through 5 show a tool 10 including an impacting structure in accordance with a first embodiment of the present invention. The tool 10 has a tool head 20 which has a connecting portion 21 for receiving a pivot and a it face 22 configured that the impacting structure selectively hits. The tool 10 further includes a shaft structure 30 connected to the tool head 20. The shaft structure 30 has a connecting portion 31 which links with the connecting portion 21 of the tool head 20 when the shaft structure 30 and the tool head 20 are connected with each other. The shaft structure 30 has a body portion 32. The body portion 32 is of hexagonal cross section.

The tool 10 further includes a shaft structure 40 which can selectively hits the tool head 20. i.e. a hitting portion 41 at an end of the shaft structure 40 can selectively impacts the face 22. The shaft structure 40 is movable between a first position in which the hitting portion 41 contacts with the face 22 and a second position in which the hitting portion 41 is separated from the face 22. The shaft structure 40 has a rod 44. The shaft structure 40 is coupled to the shaft structure 30. The shaft structure 30 is movably attached to a body portion 42 of the shaft structure 40, The shaft structure 30 is movable with respect to the shaft structure 40 such that the tool head 20 is moved toward and away from the shaft structure 40. The body portion 42 is attached to the rod 44 and in a form of a sleeve 43. The sleeve 43 has a hole 431 receiving the shaft structure 30, i.e. the body portion 32. The shaft structure 30 is movable axially along an axis L1 with respect to the shaft structure 40.

The body portion 42 is adapted to stop the shaft structure 30. The body portion 42 abuts at least one stopping portions 33 of the shaft structure 30, which protrudes radially outwardly from the body portion 32, to stop the shaft structure 30. The at least one stopping portions 33 includes two stopping portions 33 and 34 on opposite ends of the shaft structure 30. Each of the stopping portions 33 and 34 is in a form of a protrusion and disposed outside the hole 431. The stopping portions 33 and 34 are located on opposite sides of the body portion 42. The stopping portion 34 prevents the shaft structure 30 detaching from the body portion 42.

Figure 6:
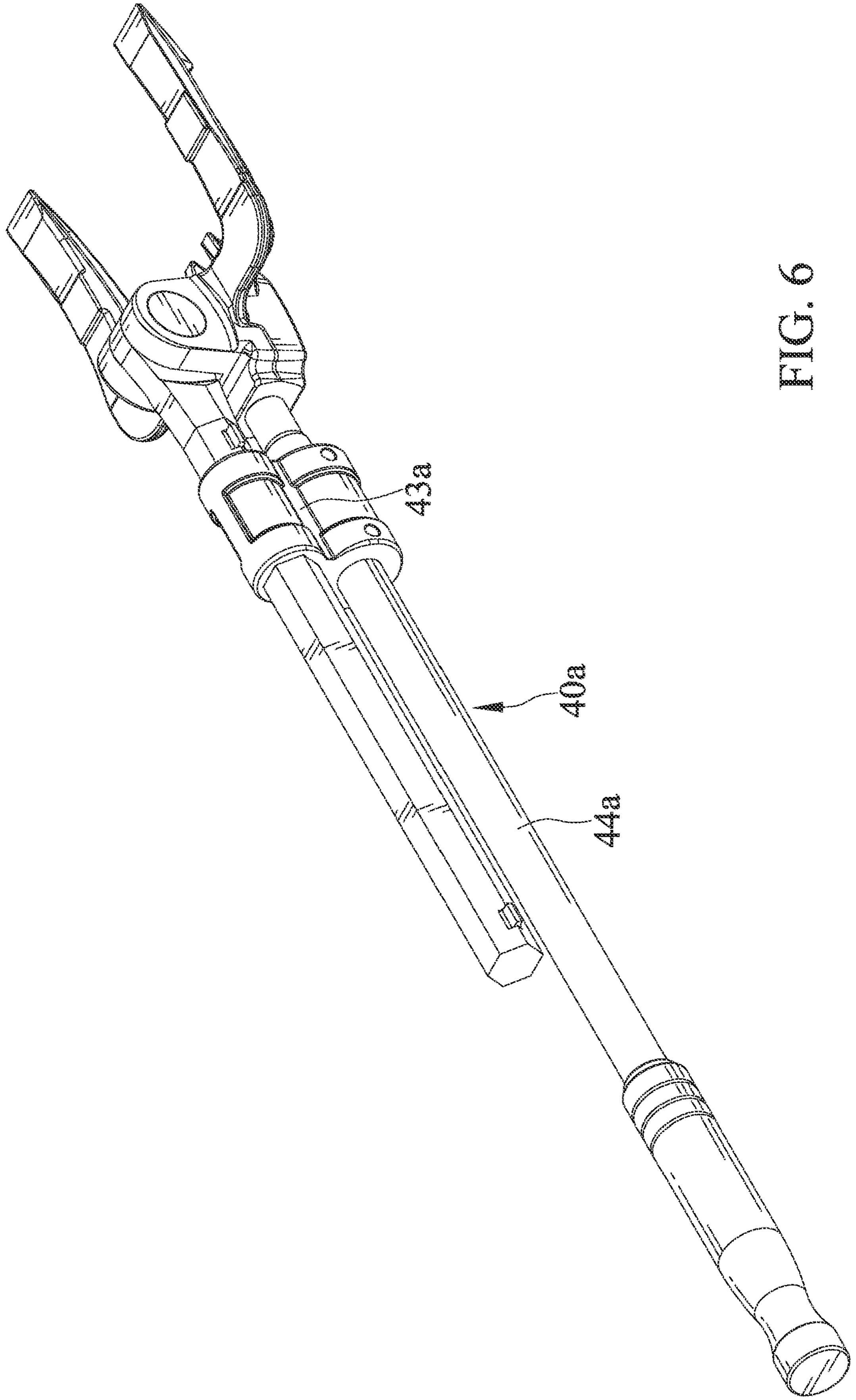
FIG. 6 a perspective view of a tool including an impacting structure in accordance with a second embodiment of the present invention.
Figure 7:
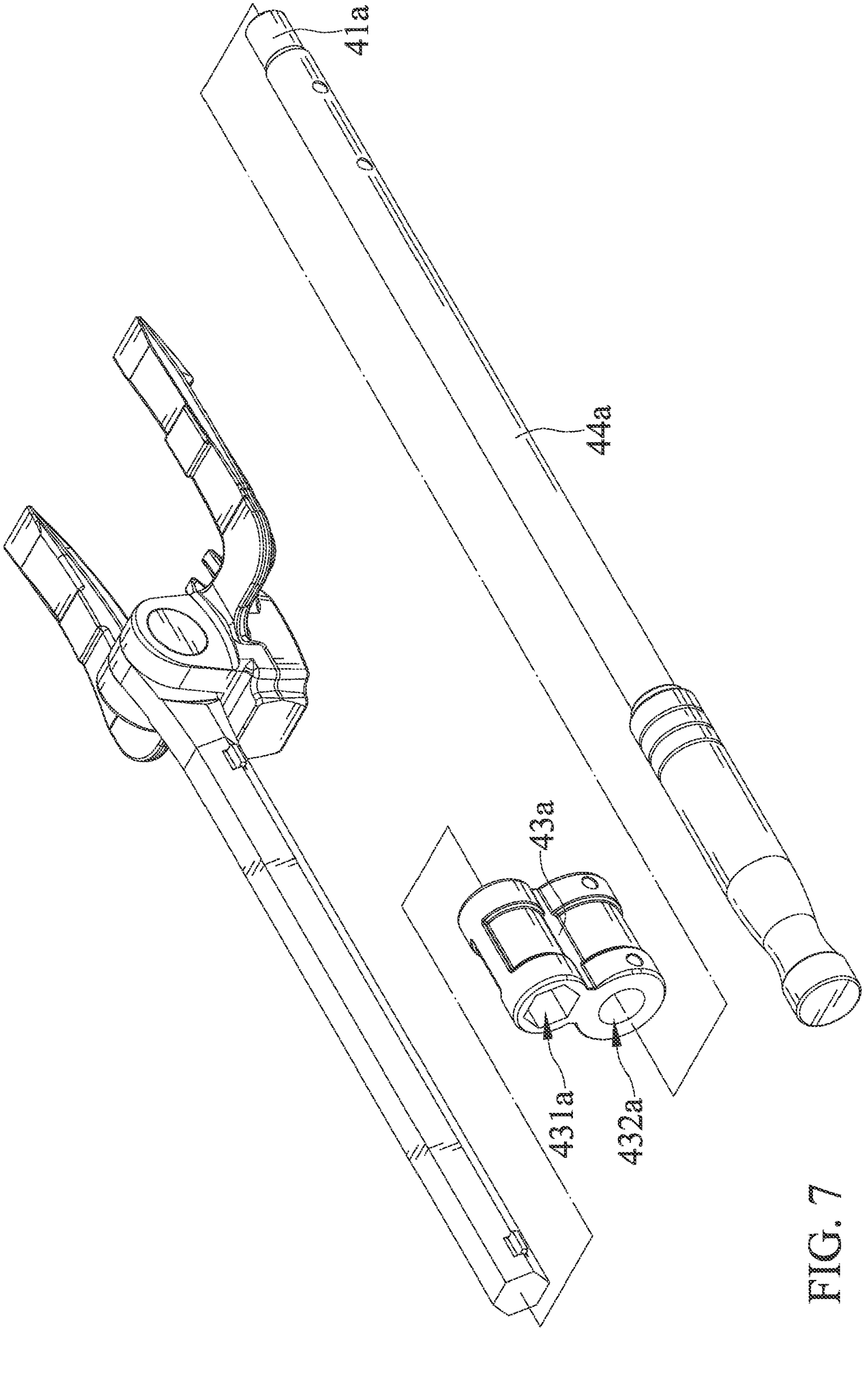
FIG. 7 is an exploded perspective view of the tool shown in FIG.
Figure 8:
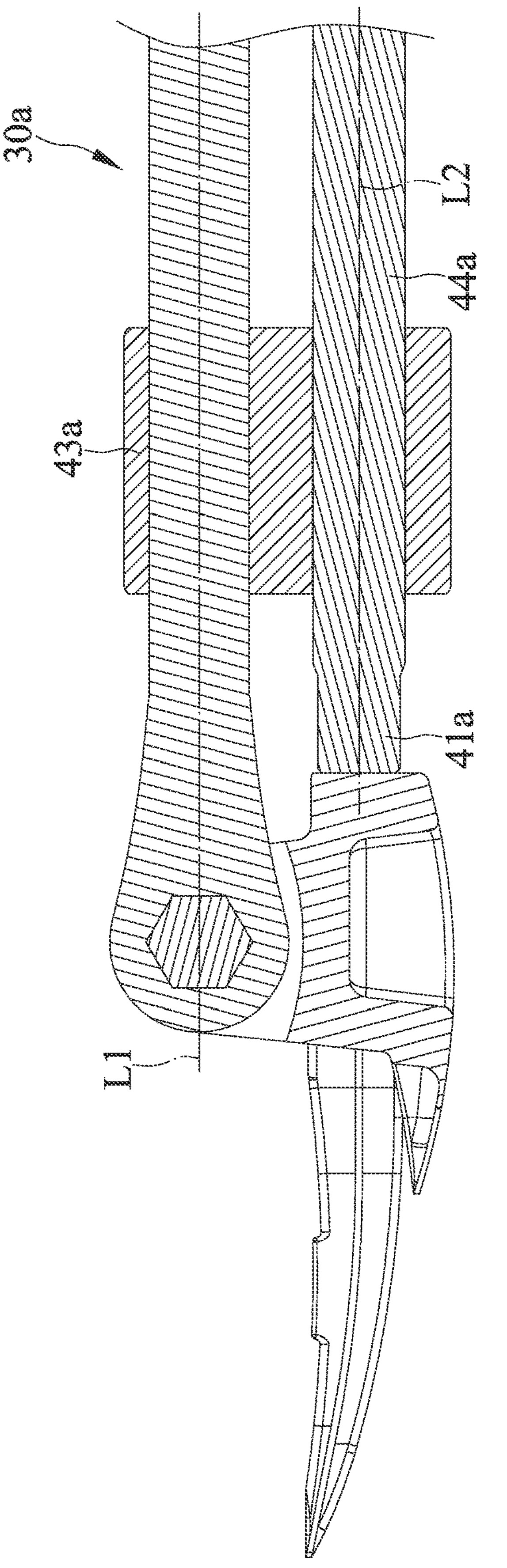
FIG. 8 is a cross-sectional view of the tool shown in FIG. 6.

FIGS. 6 through 8 show a tool including an impacting structure in accordance with a second embodiment of the present invention, and the same numbers are used to correlate similar components of the first embodiment, but bearing a letter a. The tool includes a shaft structure 40*a* which can selectively hits the tool head, i.e. a hitting portion 41*a* at an end of the shaft structure 40*a* can selectively impacts the face. The shaft structure 40 has a rod 44*a*. The second embodiment differentiates from the first embodiment in that the shaft structure 40*a* includes a sleeve 43*a* having a hole 431*a* receiving a shaft structure 30*a* and a hole 432*a* receiving the shaft structure 40*a*, respectively. The shaft structure 40*a* is axially movable along an axis L2. The axis L2 is parallel to the axis L1. Further, the hole 432*a* has at least one retaining portion 433*a* in a form of a protrusion and the sleeve 43*a* includes at least one through hole 434*a* extending radially therethrough from the hole 432*a*. The shaft structure 40*a* has at least one retaining portion 441*a* in a form of a recess. The at least one retaining portion 433*a* and the at least one retaining portion 441*a* selectively engage with and disengage from each other. The at least one retaining portion 433*a*, the at least one retaining portion 441*a*, and the at least one through hole 434*a* are aligned. The at least one through hole 434*a* enables the depressibility of the at least one retaining portion 433*a*, thereby facilitating engagement and disengagement of the at least one retaining portion 433*a* and the at least one retaining portion 441*a*.

Figure 9:
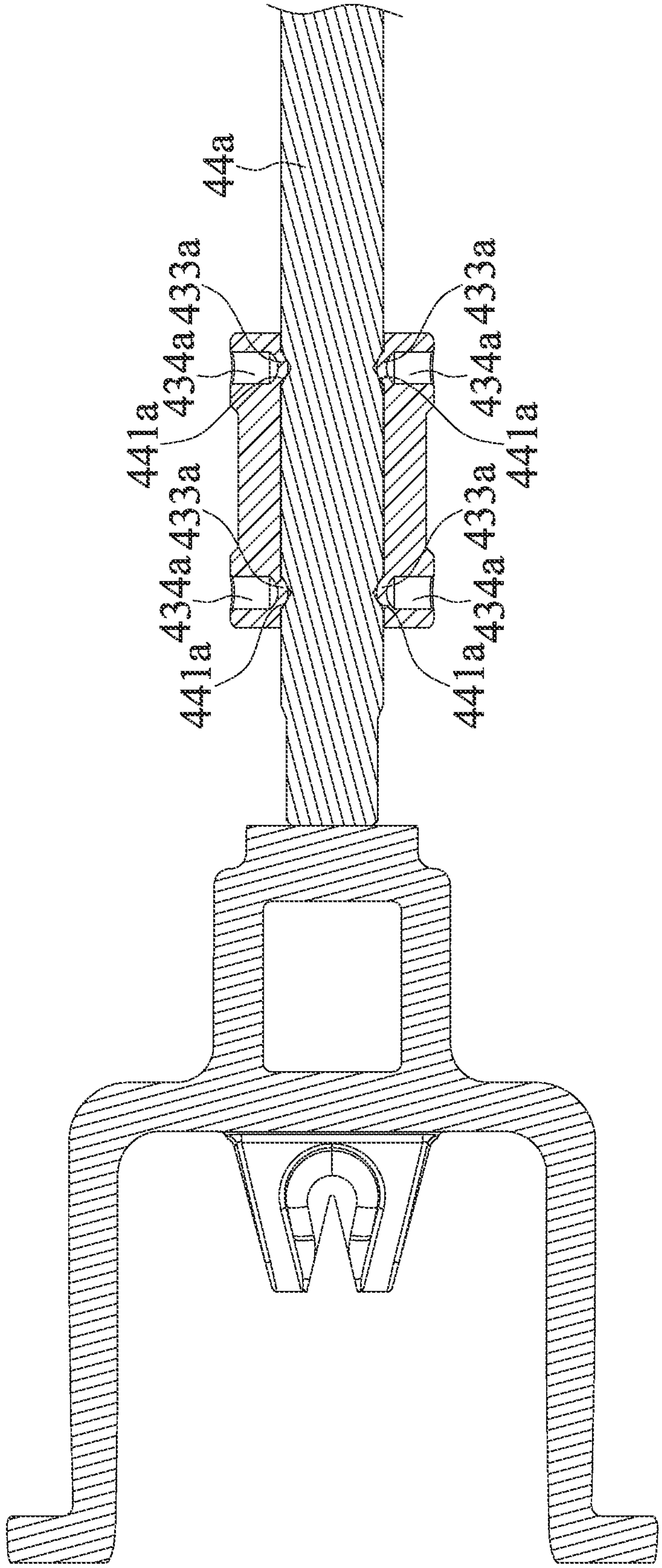
FIG. 9 is another cross-sectional view of the tool shown in FIG. 6.
Figure 10:
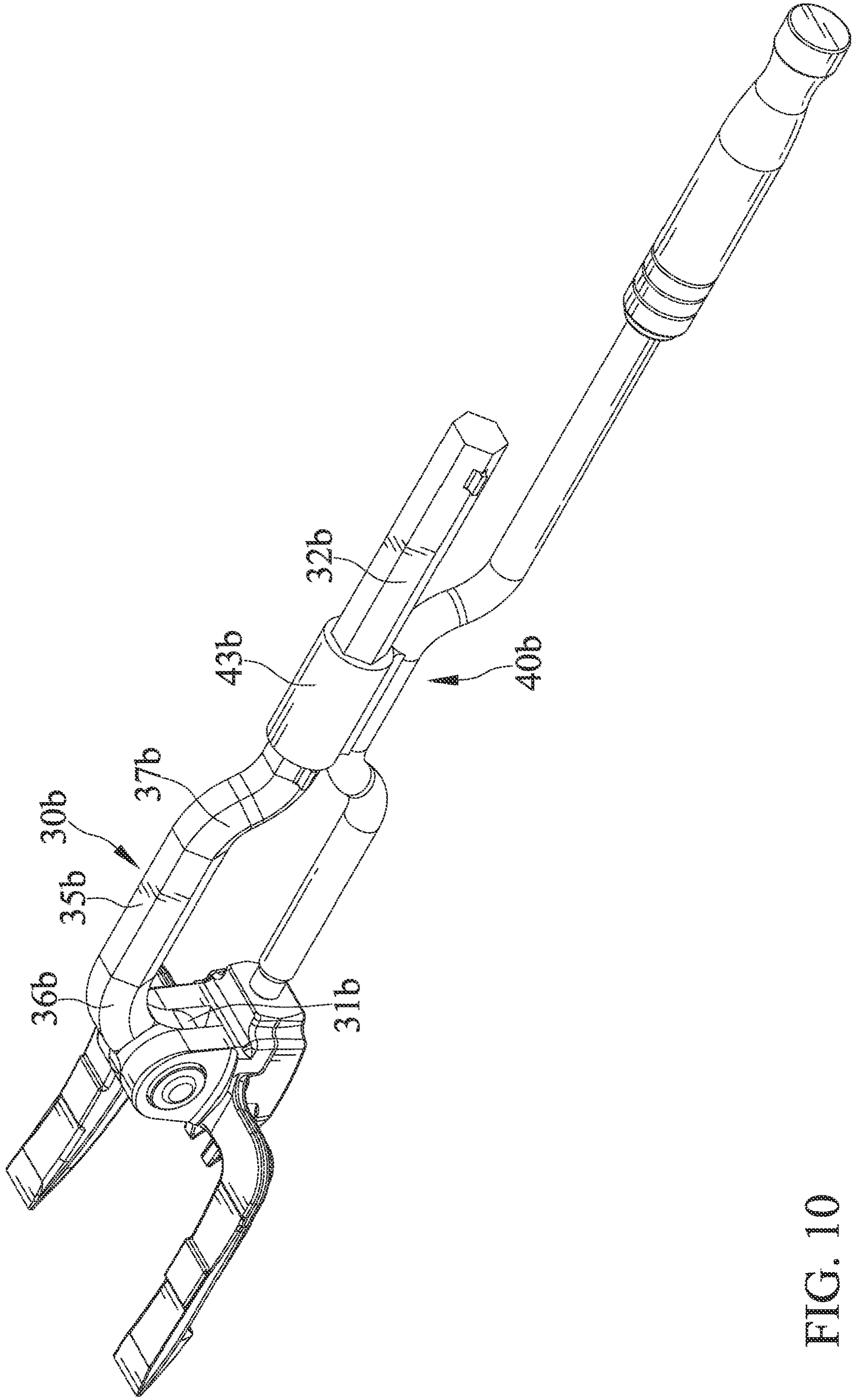
FIG. 10 is a perspective view of a tool including an impacting structure in accordance with a third embodiment of the present invention.
Figure 11:
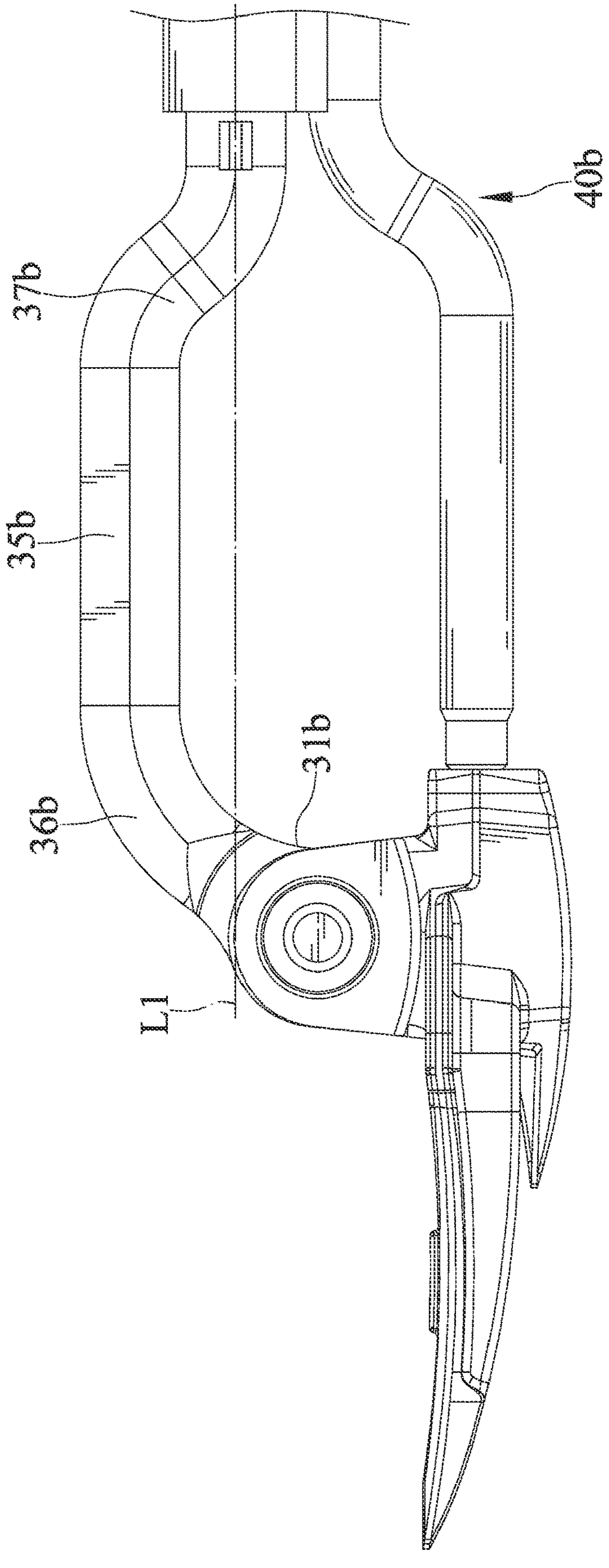
FIG. 11 is a side view of the tool shown in FIG. 10.

FIGS. 9 and 10 show a tool including an impacting structure in accordance with a third embodiment of the present invention, and the same numbers are used to correlate similar components of the first embodiment, but bearing a letter b. The third embodiment differentiates from the first embodiment in that a shaft structure 30*b* includes a portion of a body portion 32*b* forming a handle 35*b*. The body portion 32*b* extends along the axis L1, and the handle 35*b* and a shaft structure 40*b* are on opposite sides of the axis L1. The handle 35*b* and the shaft structure 40*b* therefore delimit a space allowing a user's fingers to insert. In the embodiment, the handle 35*b* includes two bending structures 36*b* and 37*b* which does not extend along the axis L1. The bending structure 30*b* has an end adjacent to a connecting portion 31*b*. The bending structure 37*b* is unable to move through a sleeve 43*b* of the shaft structure 40*b*. Therefore, the handle 35*b* is unable to move through the sleeve 43*b*.

In view of the foregoing, the shaft structures 30 and 40 are movably coupled to each other. Thus, when the tool head 20, which is a used to pry a work piece, suffer a problem of moving with respect the work piece, the shaft structure 40, 40*a*, and 40*b* can be moved to counteract friction between the tool head 20 and the work piece, thereby moving the tool head 20.

The foregoing is merely illustrative of the principles of this invention and various modifications can be made by those skilled in the art without departing from the scope and spirit of the invention.

What is claimed is:

1. A tool including an impact structure, comprising:

a tool head;

a first shaft structure connected to the tool head; and a second shaft structure, which is adapted to selectively hit the tool head movably attached to the first shaft structure, wherein the first shaft structure is movable with respect to the second shaft structure such that the tool head is moved toward and away from the second shaft structure;

wherein the first shaft structure is movably attached to a body portion of the second shaft structure, wherein body portion is in a form of a sleeve, and wherein the sleeve has a first hole receiving a bod portion of the first shaft structure; and wherein the first shaft structure includes at least one stopping portion, wherein the body portion of the second shaft structure is adapted to stop the first shaft structure, and wherein the body portion of the second shaft structure abuts at least one stopping portions when the shaft structure is stopped; and wherein the at least one stopping portion includes two stopping portions on opposite ends of the first shaft structure, wherein the two stopping portions are located on opposite sides of the body portion of the second shaft structure, and wherein one of the two stopping portions prevents the first shaft structure detaching from the body portion of the second shaft structure.

2. The tool as claimed in claim 1, wherein the second shaft structure includes a hitting portion at an end thereof adapted to selectively impact a face of the tool head, and wherein the second shaft structure is movable between a first position in which the hitting portion contacts with the face and a second position in which the hitting portion is separated from the face.

3. The tool as claimed in claim 1, wherein each of the two stopping portions is in a form of a protrusion and disposed outside the first hole, and) produces radially outwardly from the body portion of the first shaft structure.

4. A too including an impact structure, comprising:

a tool head;

a first shaft structure connected to the tool head; and a second shaft structure, which is adapted to selectively hit the tool head movable attached to the first shaft structure, wherein the first shaft structure is movable with respect to the second shaft structure such that the tool head is moved toward and away from the second shaft structure;

wherein the first shaft structure is movably attached to a body, portion of the second shaft structure, wherein bod portion is in a form of a sleeve, and wherein the sleeve has a first hole receiving a body portion of the first shaft structure; and wherein the sleeve has a second hole receiving the second shaft structure.

5. The tool as claimed in claim 4, wherein the second hole has at least one first retaining portion and the sleeve includes at least one through hole extending radially therethrough from the second hole, wherein the second shaft structure has at least one second retaining portion, and wherein the at least one first and second retaining portions selectively engage with and disengage from each other.

6. The tool as claimed in claim 5, wherein the at least one first retaining portion, the at least one retaining portion, and the at least one through hole 434*a* are aligned.

7. A tool including an impact structure, comprising:

a tool head;

a first shaft structure connected to the tool head; and a second shaft structure, which is adapted to selectively hit the tool head movably attached to the first shaft structure, wherein the first shaft structure is movable with respect to the second shaft structure such that the tool head is moved toward and away from the second shaft structure;

wherein the first shaft structure is movably attached to a body portion of the second shaft structure, wherein body portion is in a form of a sleeve, and wherein the sleeve has a first hole receiving a body portion of the first shaft structure; and wherein the body portion of the first shaft structure forms a handle, wherein the handle and the second shaft structure are on opposite sides of an axis, wherein the handle and the second shaft structure delimit a space allowing a user's fingers to insert.

8. The tool as claimed in claim 7, wherein the handle includes a first and a second bending structure which does not extend along the axis, and wherein the second bending structure is unable to move through the sleeve of the shaft structure.

* * * * *